Oct. 4, 1932.　　　　J. W. KAYE　　　　1,880,204

AUTOMATIC WATER LOGGING FLOAT FOR STEAM TRAPS

Filed Aug. 16, 1930

INVENTOR.
JAMES W. KAYE

BY
*Irving McCathran* ATTORNEY

Patented Oct. 4, 1932

1,880,204

UNITED STATES PATENT OFFICE

JAMES W. KAYE, OF WEST ORANGE, NEW JERSEY, ASSIGNOR TO KAYE & MacDONALD, INC., OF WEST ORANGE, NEW JERSEY, A CORPORATION OF NEW JERSEY

AUTOMATIC WATER LOGGING FLOAT FOR STEAM TRAPS

Application filed August 16, 1930. Serial No. 475,805.

This invention relates to automatic water logging inverted bucket floats for steam traps. One of the primary objects of this water logging float is to allow the elimination of air from a steam system through the trap by keeping the inverted bucket float at the bottom of the trap until the temperature of the condensate entering the trap reaches the temperature of approximately 200° Fahrenheit, whereupon the trap will function in the same manner and accomplish the same purposes as the ordinary inverted bucket type steam traps now on the market and illustrated in the patent of A. E. Armstrong, issued July 15, 1919, and bearing Patent No. 1,309,604.

A further object of this invention is the production of an efficient self-cleaning means for keeping the normal vent of the bucket clean and free from clogging.

A still further object of this invention is the production of a simple and efficient valve for use in conjunction with the thermostat which is carried by the bucket.

Other objects and advantages of the present invention will appear throughout the following specification and claims.

In the drawing:—

Figure 1:
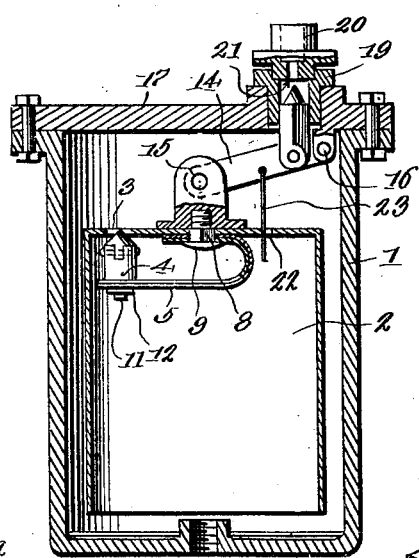
Figure 1 is a vertical section through the steam trap showing my novel thermostatically controlled means mounted in the inverted bucket float.
Figure 2:
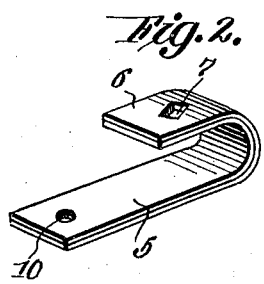
Figure 2 is a perspective view of the thermostatic unit.

By referring to the drawing it will be seen that 1 designates the steam trap within which is mounted an inverted bucket float 2, which float 2 is provided in its upper closed end with an orifice or aperture 3, which orifice 3 is closed at a desired temperature by means of the valve 4. This valve 4 is carried by the free end of the thermostatic unit 5, which thermostatic unit 5 is preferably U-shaped and is formed of a plurality of laminations, preferably two metals having widely different coefficients of expansion. The upper arm 6 of the thermostatic unit 5 is provided with a squared aperture 7 which fits over the squared shank 8 of the bolt 9, thereby anchoring the thermostatic unit 5 in proper position for holding the valve 4 in proper alignment with the orifice 3 and causing the valve 4 to properly seat at all times. The thermostatic unit 5 is provided with an aperture 10 at one end for receiving the reduced shank 11 of the valve 4, this shank 11 carrying a suitable nut 12 for locking the valve 4 in position upon the thermostatic unit 5.

A cap 13 is threaded upon the upper end of the bolt 8 and to the upper end of this cap is pivotally secured the lever 14 as indicated as at 15. This lever 14 is also pivotally connected to a depending ear 16 carried by the top 17 of the steam trap 1 and this lever 14 also carries a valve 18 mounted within a guide 19 carried by the top 17 and a suitable outlet 20 is secured to the guide 19. It should be understood that the valve 18 will be controlled by the movement of the bucket 2 and as the bucket 2 moves upwardly the valve will be closed upon its seat 21 and as the bucket 2 moves downwardly the valve 18 will be drawn away from the seat 21.

The bucket 2 is provided with an aperture or normally opened vent 22 in which works a small rod or cleaning member 23, this rod 23 being secured to the lever 14 and mounted for free swinging movement. The aperture or vent 22 is preferably of considerable greater size than the rod 23 to permit a certain amount of lateral swing as the device is in operation, in this way keeping the vent or aperture 22 clean and free from clogging.

In operation of my improved device, the same is placed in a steam system at the desired point by the use of a suitable branch pipe which allows the flow of condensate into the trap. At the start of operation of the system and before the steam condensate has reached say a temperature of 200° F. the bucket 2 by its weight will be in its lowermost position and air and steam will flow directly through the bucket through the outlet 3 and out of the trap through the valve passage 21. Thus air and gases are free to pass from the inside of the bucket to the outside as noted above. This means that the inverted bucket 2 will remain at the bottom of the casing 1 and allows the free passage of condensate, air and non-condensable gases through the trap, thus eliminating air and non-condensable gases at a rate governed by the size of the orifice in the valve seat 20. When the temperature of the condensate or steam entering the inverted bucket 2 reaches a temperature of 200° F. the thermostatic element 5 comes into action, forcing valve 4 in an upward position, closing the passage through orifice 3, thus causing the inverted bucket 2 to become a normal inverted bucket float. Steam entering the inverted bucket 2 displaces the water and creates sufficient buoyant force to float the inverted bucket, eliminating the weight of the inverted bucket from the end of the lever 14 which allows the pressure to close the valve 18 against its seat 21.

As long as the temperature inside of the inverted bucket 2 remains above 200° F. orifice 3 is closed by valve 4. In the top of the inverted bucket 2 is drilled the orifice 22 which permits the normal action of this type of trap to eliminate air binding.

When the valve 4 is closed, the bucket acts in the ordinary manner, as described in the steam trap of A. E. Armstrong, Patent #1,309,604, heretofore mentioned. This normal operation of the float is as follows:—

Steam entering the trap (considering the valve 4 closed) acts against the inside of the bucket 2, raises the bucket and closes the control valve 18. As the steam condenses and as condensate enters the bucket the lower inlet in the trap is closed, thus water sealing this inlet and the bucket becomes water logged and falls to the bottom of the casing opening valve 18 allowing the pressure of the steam to force the air and water from out of the trap around the bucket. The orifice 22 prevents the bucket from becoming air bound, as air acts the same as steam, causing the float to rise. That is air and other incondensable gases escape from the float through the small vent 22 and air is collected in the top of the trap displacing or changing places with water which enters the float at the bottom. When the float drops the valve 18 will be open and the air is drawn off so that air binding cannot occur.

As soon as the temperature of the condensate drops below 200° F. the thermostat will again come into action opening the main valve 4 of the float, allowing the free escape of air and gases through the bucket, which will cause the float to drop.

From the foregoing description, it will be seen that a very simple and efficient means has been produced for automatically logging the float of a steam trap for air venting the inverted bucket thereof and it should be understood that when quick heating is desired, this automatic float or bucket 2 is waterlogged although there is a large quantity of air or incondensable gases, this float keeps the valve of the trap wide open until a temperature of about 200° F. is reached. When this temperature is reached, the automatic bucket 2 will function normally due to the fact that the valve 4 will be forced upon its seat through the action of the thermostatic unit 5. Furthermore it should be understood that the bucket 2 with its thermostatic unit vent valve 4 has the same pressure on both sides of the bucket and this valve 4 is not necessarily absolutely tight, in view of the fact that the bucket is normally vented through the vent opening 22. The bucket can be used in any pressure without injury to the unit.

Figure 4:
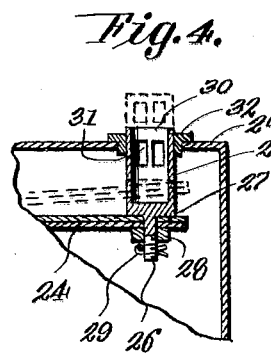
Figure 4 is a vertical sectional view through the modified form of valve shown in Figure 3.
Figure 3:
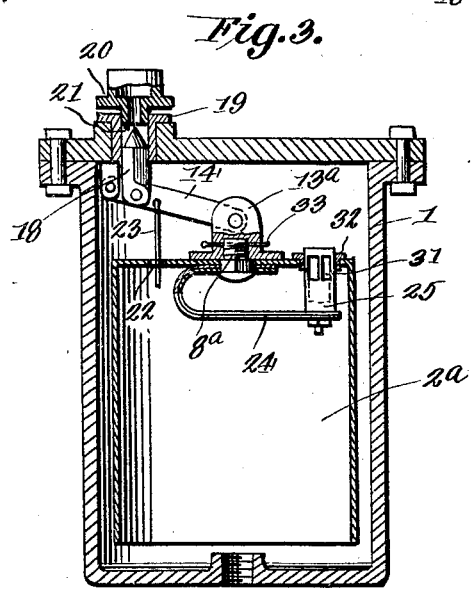
Figure 3 is a vertical section through the steam trap showing a modified form of valve.

As shown in Figures 3 and 4, a thermostatic unit 24 is illustrated which carries a hollow valve 25, which valve 25 is provided with a reduced extension 26 at its lower end extending through the apertured end 27 of the thermosatic unit 24. A suitable nut 28 is mounted thereon for holding the valve 25 in engagement with the thermostatic unit and a cotter pin 29 may be passed through the extension of the valve 25 for preventing the nut 28 from working loose. This hollow valve 25 is provided with an open upper end 30 and a plurality of elongated ports 31 upon its side, this valve 25 passing through a suitable guide 32 carried in the top of the bucket 2. It should be understood that in the position shown in Figure 4 an escape may be had through the ports 31 and up through the outer end of the hollow valve 25 but as the thermostatic unit 24 is raised to the dotted position, the ports 31 will be moved to a closed position through the guide 32.

As shown in Figure 3 a suitable cotter pin or other securing means 33 may be passed through the cap 13ª for the purpose of locking the screw or bolt 8ª against rotation after the same has been threaded into the cap 13ª.

It should be understood that certain detail changes in the mechanical construction may be employed without departing from the spirit of the invention, so long as these changes fall within the scope of the appended claims.

What is claimed as new is:

1. A steam trap of the class described comprising a casing, valve means carried thereby, a float of an inverted bucket type mounted within said casing, means for connecting said valve means with said float, said float provided with an aperture in the top thereof, a substantially U-shaped thermostatic member carried by the under face of said float, a valve carried by the free end of said thermostatic member and normally held in alignment with said aperture whereby said valve will close said aperture as the valve is raised and open said aperture as the said last mentioned valve is lowered, said float provided with a normal vent means, and means for preventing the accumulation of foreign matter in said venting means.

2. A steam trap of the class described comprising a casing, valve means carried thereby, an inverted bucket mounted within said casing, a cap carried thereby, a lever connected to said cap and engaging said valve means for actuating said valve means, said bucket provided with a vent opening, a cleaning rod suspended from said lever and fitting in said opening for normally keeping the same clean, and thermostatically controlled valve means carried by said bucket.

3. A device of the class described comprising a casing, a bucket mounted therein, a valve means for said casing, means for connecting said bucket to said valve means whereby said valve means will be opened and closed by the operation of said bucket, said bucket provided with a controlled vent opening, a guide mounted within said opening, a hollow valve reciprocatively mounted within said guide and provided with an open upper end and having a plurality of ports formed in the sides thereof, and thermostatically controlled means engaging the lower end of said hollow valve for raising and lowering the same in said guide whereby said ports will be opened and closed.

4. A steam trap of the class described comprising a casing, valve means carried thereby, an inverted bucket mounted within said casing, a cap carried thereby, a lever connected to said cap and engaging said valve means for actuating said valve means, said bucket provided with a vent opening, and cleaning means for normally keeping said opening clean, and thermostatically controlled valve means carried by said bucket.

5. A steam trap of the class described comprising a casing, valve means carried thereby, an inverted bucket mounted within said casing, means carried by said inverted bucket for actuating said valve means, a valve carried by said bucket, thermostatically controlled means for actuating said valve carried by said bucket, and said bucket provided with an additional open vent formed therein.

In testimony whereof I affix my signature.

JAMES W. KAYE.